Oct. 9, 1945.  G. A. LYON  2,386,227
WHEEL CONSTRUCTION
Filed March 22, 1943
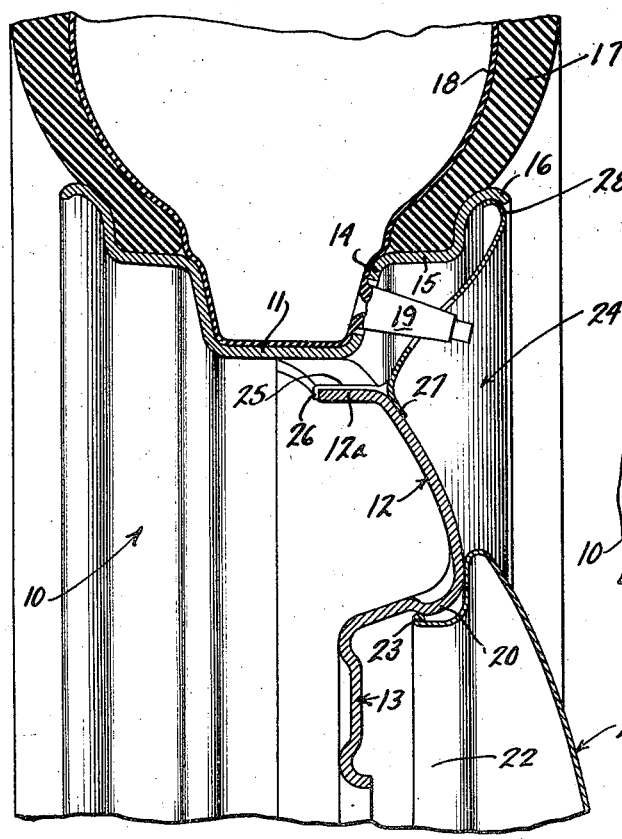
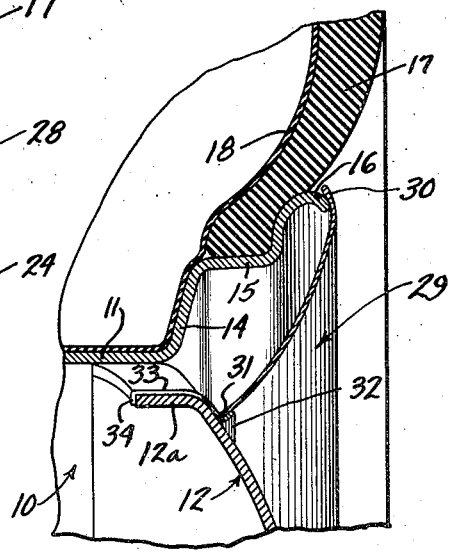
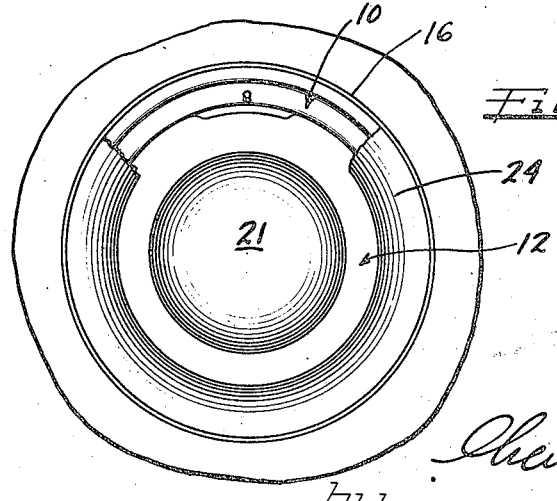
Inventor
GEORGE ALBERT LYON.
by Charles W. Hills
Attys.

Patented Oct. 9, 1945

2,386,227

UNITED STATES PATENT OFFICE 2,386,227

WHEEL CONSTRUCTION

George Albert Lyon, Allenhurst, N. J.

Application March 22, 1943, Serial No. 479,979

1 Claim. (Cl. 41—10)

This invention relates to an improved wheel structure and is directed more particularly to an improved cover assembly therefor.

It is an important object of the invention to provide for a wheel structure a molded or pressed cover member which may be fabricated efficiently and cheaply and with the wheel structure engaging means as an integral part thereof.

Still another object of the invention is to provide a novel cover member for a wheel structure which, when applied to the wheel, is maintained under a condition of stress thereby to augment the attached relationship to the wheel and to transversely strengthen the cover member.

Still a further object of the invention is to provide for a wheel structure a novel cover member having retaining means arranged to draw the same axially inwardly to maintain it under a condition of stress thus obtaining the advantages above set forth.

In accordance with the general features of the invention, there is provided herein a wheel cover structure which is well adapted for incorporation into a cover member constructed from a resiliently flexible material such as a synthetic plastic, rubber, either natural or synthetic, or from any other material having the resilient flexible characteristics of the aforementioned products.

Still another object of the invention is to provide for a wheel structure a cover assembly which, when applied to the wheel structure, is maintained thereon in a condition of stress and is so constructed and arranged that this condition of stress imposes radial forces upon the retaining means to further augment the retaining attachment thereof with the wheel structure.

It is another object of the invention to provide for a wheel structure, a cover assembly including a main body portion and retaining means adapted for retaining engagement with the wheel structure, said parts being so associated that when the cover assembly is mounted under the wheel structure, the retaining means is forcefully urged into its retaining relationship with the wheel structure thereby to augment the attachment of the cover assembly to the wheel structure.

In accordance with other general features of the invention, there is provided herein a cover assembly for a wheel structure, said cover assembly including a cover part arranged for disposition over the outer side of the tire rim of the wheel structure and including retaining means extending substantially axially inwardly from the axially inner face of the cover, said cover being so retained on the wheel structure that it is disposed in a condition of stress to urge the retaining means into retaining engagement with the wheel structure and being provided with an inner part adapted to overlie a portion of the outer face of the wheel structure to allocate the retaining means with respect to the portion of the wheel structure engaged thereby.

Other objects and advantages of my invention will become apparent from the following description and accompanying drawing in which:

Figure 1 is a fragmentary cross-sectional view of a wheel structure embodying one form of my invention;

Figure 2 is a fragmentary side elevational view with parts broken away of the structure shown in Figure 1; and Figure 3 is a fragmentary cross-sectional view of a wheel structure embodying a modified form of my invention.

As shown in Figure 1 the reference character 10 designates generally a multi-flange, drop center type of tire rim which is connected as by riveting or welding or the like through a base flange 11 to a central body part or spider 12 which includes a central bolt-on flange 13. The drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project. In the type of wheel structure disclosed herein the body part 12 thereof is provided with a substantially axially inwardly extending flange 12a which affords the junction between the body part and the tire rim 10 by engagement with the base flange 11 of the tire rim. As shown in the drawing, the flange 12a is provided with spaced depressions which, with the registering portions of the base flange 11, provide circumferentially spaced apertures in the wheel structure.

As shown in Figure 1 the body part 12 of the wheel structure is so cross-sectionally configurated as to afford a series of radially inwardly extending humps 20 which are arranged to receive a central hub cap portion 21 in snap-on pry-off relationship. To afford the desired attachment the hub cap portion 21 is provided with a snap-on flange 22 terminating in a peripheral bead 23, the flange and the bead being arranged to override the humps 20 when the hub cap portion 21 is urged axially inwardly of the wheel structure.

The cover assembly for the wheel structure is completed by a cover part 24 which in the present instance is shown as an annulus but may, if desired, be in the form of a circular disk covering the entire outer side of the wheel structure. As previously indicated, the construction of Figure 1 may be made from a synthetic plastic or rubber and as such may be pressed or molded with retaining elements 25 formed integrally therewith. The retaining elements 25 are so cross-sectionally configurated as to extend axially inwardly the depth of the flange 12a and to terminate in fingers 26 which are adapted to extend around and over the axially inner edge of the flange 12a.

It will be seen that preferably the axially inwardly extending parts 25 of the retaining members are joined to the rear or axially inner surface of the cover member 24 at a point removed radially outwardly from the radially inner peripheral edge thereof thereby to afford a radially inwardly extending flange 27 which is arranged to overlie the adjacent portion of the outer surface of the wheel body 12. At its outer peripheral edge the cover member 24 is provided with an inwardly curled margin 28 arranged for snap-on pry-off engagement against the radially inner surface of the edge portion 16 of the tire rim. It will be seen that the curled margin 28 and the inner surface of the tire rim cam against one another during the snap-on pry-off operation and the cover member 24, being slightly circumferentially over-sized relative to the radially inner surface of the edge portion 16, radially and axially inwardly directed stress is imposed upon the entire cover member 24 when it is in the attached relationship shown in Figure 1.

This stressed condition of the cover member 24 has a two fold purpose. First, it serves to cross-sectionally rigidify the cover member 24 and second, the stress forces urge the flange 27 and the retaining members 25—26 radially inwardly with respect to the wheel structure thus in effect pressing these parts against the body part 12 and into tight retaining relationship with the wheel structure.

In removing the cover member 24 from the wheel structure it will be seen that the curled flange 28 may be separated therefrom by the insertion of a pry-off tool such as a screw driver and this having been accomplished, the aforementioned radial stresses will be relieved whereupon the retaining members 25 and the flange 27 may be withdrawn from the wheel structure.

It will be understood of course that in order to accommodate a wheel structure such as that shown in Figure 1, the retaining members 25 are spaced on the inner surface of the cover member 24 so that they may be aligned with the respective circumferentially spaced apertures provided between the base flange 11 and the flange 12a of the body part 12.

In the construction shown in Figure 3 the cover assembly is likewise retained upon the wheel structure by the stress condition described in connection with the structure shown in Figure 1.

In this embodiment of the invention the cover member 29 is provided with an outer peripheral margin 30 adapted for engagement around the outer side of the edge portion 16 of the tire rim 10 and an inner peripheral edge portion 31 adapted to be retained in nested relationship by a retaining member, preferably annular, and formed from metal, plastic, rubber or the like, having a retaining portion 32 cross-sectionally configurated to provide a radially outwardly opening groove and being provided with retaining fingers including substantially axially inwardly extending portions 33 and radially inwardly extending terminal ends 34. As shown in Figure 3 the portions 33, like the portions 25 of Figure 1, are adapted to overlie the radially outer surface of the flange 12a at the spaced apertures between the tire rim and the body part and the terminal portions 34 are adapted to overlie the axially inner edge surface of the flange 12a.

In this construction the aforementioned stress forces are obtained by the cross-sectional curvature or configuration of the cover member 29. This configuration is such that when the outer peripheral margin 30 of the cover member 29 is in the position shown in Figure 3 the inner peripheral edge thereof normally would be disposed in a position axially outwardly over that shown in the drawing. Thus, when the cover member 29 is disposed in the assembled relationship shown in Figure 3, the inner peripheral margin 31 thereof is drawn inwardly to cross-sectionally distort the cover member 29 and thus to retain the same under a condition of stress. It will be seen that the tendency of the inner marginal portion 31 to move axially outwardly will draw the retaining member axially outwardly and radially inwardly of the wheel structure thus to force the retaining member and particularly the retaining portions 33 and 34 thereof into tighter engagement with the flange 12a of the body part 12.

It is to be understood that while the foregoing retaining assemblies are well adapted for use with resilient, plastic like covers, such a construction is also well adapted for use with the well known metallic covers.

From the foregoing it will be seen that there is provided herein an improved retaining arrangement for a cover assembly whereby the retention of the cover upon the wheel structure is augmented and made more secure solely by the imposition of stress forces imposed thereon by the cover member itself.

What I claim is:

In a cover structure for a wheel having a flanged tire receiving rim part and a body part, said parts being provided with spaced openings between them, a wheel cover for substantially covering exposed outer side flanges of the rim part so as to appear in use to be a continuation of the tire side wall, said cover being made of form-sustaining, yieldable material and having an outer edge in nested relation with an outer edge of the rim part and retaining means for said cover including an annular member having a portion extending axially rearwardly into a wheel opening and hooked over an edge of one of said wheel parts, said annular member overlying the outer face of the body part and being formed with an out-turned flange defining a groove and said cover having an inner marginal edge detachably supported in said groove behind the flange.

GEORGE ALBERT LYON.